United States Patent
Nishikawa et al.

(10) Patent No.: US 6,306,954 B1
(45) Date of Patent: Oct. 23, 2001

(54) ADHESIVE RESIN COMPOSITION AND HEAT-SHRINKABLE ARTICLES MADE BY USING THE SAME

(75) Inventors: Shinya Nishikawa; Hiroshi Hayami; Kiyoaki Moriuchi; Akira Nishimura, all of Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/380,046

(22) PCT Filed: Jan. 8, 1999

(86) PCT No.: PCT/JP99/00054

§ 371 Date: Aug. 25, 1999

§ 102(e) Date: Aug. 25, 1999

(87) PCT Pub. No.: WO99/35206

PCT Pub. Date: Jul. 15, 1999

(30) Foreign Application Priority Data

Jan. 12, 1998 (JP) .................................... 10-14725

(51) Int. Cl.⁷ .................................... C08L 77/00
(52) U.S. Cl. .................................... 524/514
(58) Field of Search .................................... 524/514

(56) References Cited

FOREIGN PATENT DOCUMENTS

| | | |
|---|---|---|
| 49-096053 | 9/1974 | (JP) . |
| 603-168774 | 9/1985 | (JP) . |
| 61-002781 | 1/1986 | (JP) . |
| 61-188479 | 8/1986 | (JP) . |
| 2-003490 | 1/1990 | (JP) . |
| 2-006580 | 1/1990 | (JP) . |
| 5-247426 | 9/1993 | (JP) . |
| 6-065554 | 3/1994 | (JP) . |
| 6-336580 | 12/1994 | (JP) . |
| 7-157734 | 6/1995 | (JP) . |
| 9-111215 | 4/1997 | (JP) . |

*Primary Examiner*—Edward J. Cain
(74) *Attorney, Agent, or Firm*—McDermott, Will & Emery

(57) ABSTRACT

A hot-melt adhesive comprises a resin composition comprising (a) from 0.1 to 50 parts by weight of a polyolefin resin obtained by copolymerizing 80% by weight or more of a non-polar α-olefin with 20% by weight or less in total of a monomer containing 5% by weight or more of a carboxyl group and a polar α-olefin, or with 20% by weight or less in total of a monomer containing 0.5% by weight or more of an acid anhydride group and a polar α-olefin, (b) from 0 to 80 parts by weight of a copolymer of ethylene and a non-polarα-olefin, or a polyolefin resin containing 20% by weight or less of a polar α-olefin, and (c) from 10 to 90 parts by weight of a polyamide, provided that the total amount of the components (a), (b) and (c) is 100 parts by weight, the resin composition having a melt index of 5 g/10 min or more and less than 500 g/10 min. The hot-melt adhesive resin composition of the invention has excellent adhesiveness to both non-polar and polar adherends. A heat recoverable article using the hot-melt adhesive is valuable for processing a joint and an end of electric cables.

11 Claims, No Drawings

ADHESIVE RESIN COMPOSITION AND HEAT-SHRINKABLE ARTICLES MADE BY USING THE SAME

FIELD OF THE INVENTION

The present invention relates to a novel hot-melt adhesive useful for bonding various non-polar and polar materials, such as polyethylene, polyvinyl chloride and metals. Also, the invention relates to a heat recoverable article using the hot-melt adhesive, such as a heat shrinkable tube with an adhesive for processing a joint of electric cables and an end of wiring in various apparatus.

BACKGROUND OF THE INVENTION

A heat recoverable article such as a heat shrinkable tube has been used for various applications including processing of a joint (connected part) of electric cables and an end of wiring in various apparatus, and protection against corrosion of a steel pipe.

For example, a heat shrinkable tube is placed on a joint of electric cables and then heated, the tube is shrunk to fit in close contact along the contour of the joint, and the joint can be protected from external injury.

In the event that higher close contact is required to yield waterproofness, a heat shrinkable tube with an adhesive is formed by coating a hot-melt adhesive on an inner surface of a heat shrinkable tube.

As a resin used as the hot-melt adhesive, a hot-melt adhesive including an ethylene-vinyl acetate copolymer (EVA) and an ethylene-ethyl acrylate copolymer (EEA), and a hot-melt adhesive including a polyamide resin and a saturated copolymerization polyester resin have been generally used.

From these, a suitable hot-melt adhesive is selected depending on the material of the heat shrinkable tube, on which the adhesive is coated, and an adherend.

The following method is generally used as a process for producing a heat recoverable article, such as a heat shrinkable tube. A resin composition comprising a polymeric martial is shaped into a tube form, and crosslinked or partially crosslinked by irradiation of an ionization radiation, such as electron beams and γ-ray, chemical crosslinking, or silane crosslinking. It is then inserted into a mold having a prescribed shape and expanded under a high-temperature atmosphere, followed by cooling while maintaining its expanded shape.

In the production process, the crosslinking with an ionization radiation has good productivity owing to a short crosslinking time, and thus is widely employed in industry as a crosslinking method of a heat shrinkable tube.

In the event that a hot-melt adhesive is used as an inner layer material, the hot-melt adhesive is previously coated on an inner surface of the heat shrinkable tube, which is then crosslinked by irradiating an ionization radiation.

A polyamide-based hot-melt adhesive, a saturated polyester-based hot-melt adhesive, an EVA-based hot-melt adhesive and an EEA-based hot-melt adhesive have been used as an inner layer of a heat shrinkable tube.

The polyamide-based hot-melt adhesive and the saturated polyethylene, polyester-based hot-melt adhesive can be extremely well adhered to a polar material, such as a polyvinyl chloride resin (PVC) and a metal, but cannot be strongly adhered to a non-polar material using a polyolefin, such as polyethylene, EVA and EEA.

On the other hand, the EVA-based hot-melt adhesive and the EEA-based hot-melt adhesive having a small vinyl acetate (VA) content and a small ethyl acrylate (EA) content, respectively, can be well adhered to a polyolefin such as polyethylene, EVA and EEA, but cannot be well adhered to PVC. Those having a relatively large VA content or EA content can be well adhered to PVC and a metal, but have a lower adhesive strength to a polyethylene resin (PE). The EVA and EEA resins having a large VA content or EA content necessarily have a low softening point, and have a drawback of being unable to be practically used because tackiness occurs in a room temperature range, and they are melted under a high-temperature atmosphere.

Even when the well adhered polyamide-based hot-melt adhesive to PVC and a metal and the well adhered EVA-based or EEA-based hot-melt adhesive to PE are simply mixed with each other, a hot-melt adhesive that can well adhere to all PVC, a metal, and a polyolefin such as PE and EVA cannot be obtained due to incompatibility with each other.

JP-A-7-157734 and JP-A-9-111215 disclose a hot-melt adhesive containing a polyamide resin, an EVA having a vinyl acetate content of from 20 to 60% by weight, a saponified EVA or a graft copolymer of EVA, and polycarboxylic acid anhydride. The references as identified above also disclose that the hot-melt adhesive is preferably used for adhering a metal to a metal, or a metal to a polymer having a polarity base such as polyvinyl chloride, polycarbonate, nylon, ABS resin, acrylic resin, or polyethylene terephthalate. However, the references do not refer to adhesion to a non-polar polymer such as PE.

In the event that the hot-melt adhesive contains EVA, it is not preferable to irradiate electron beams on the hot-melt adhesive because rust is likely to occur at the adhered interface to a metal.

Furthermore, when a halogen-based flame retardant, such as decabromodiphenyl ether, is added to the conventional hot-melt adhesives, e.g., the polyamide-based hot-melt adhesive, the saturated polyester-based hot-melt adhesive, the EVA-based hot-melt adhesive, the EEA-based hot-melt adhesive, to make the inner layer material flame retardant, the adhesiveness to PE deteriorates.

Under these circumstances, the development of a hot-melt adhesive that can adhere well to all PVC, a polyolefin such as PE and EVA, and a metal such as iron and copper is strongly demanded, as well as the development of a heat shrinkable tube having a flame retardant inner layer comprising a hot-melt adhesive that can adhere well to all PVC, a polyolefin such as PE and EVA, and a metal such as iron and copper.

SUMMARY OF THE INVENTION

An object of the invention is to provide a hot-melt adhesive excellent in adhesiveness to various non-polar and polar adherends such as PVC, a metal and PE, and a heat recoverable article including a heat shrinkable tube with an adhesive, the inner surface of which is coated with the hot-melt adhesive.

Another object of the invention is to provide the hot-melt adhesive and the heat recoverable article with flame retardant qualities.

A further object of the invention is to provide a molded article having a tube form or a rod form with improved adhesiveness, waterproofness and corrosion resistance by the combined use with a heat recoverable article.

As a result of earnest investigation by the inventors, it has been found that when a composition comprising (a) a polyolefin resin containing an α-olefin monomer containing a specific acid or acid anhydride, (b) a copolymer of ethylene and a non-polar α-olefin, or a polyolefin resin containing a polar α-olefin in a low concentration, and (c) a polyamide is used as a hot-melt adhesive composition, and its composition and flow characteristics are specified, a hot-melt adhesive can be obtained that exhibits excellent adhesiveness to both polar and non-polar adherends, is not lowered in adhesive strength at low temperature, and does not form rust at the adhesion interface to an adhered metallic. Thus, the invention has been completed.

The invention relates to the following aspects:

(1) A hot-melt adhesive comprising a resin composition comprising (a) from 0.1 to 50 parts by weight of a polyolefin resin obtained by copolymerizing 80% by weight or more of a non-polar α-olefin with 20% by weight or less in total of a monomer containing 5% by weight or more of a carboxyl group and a polar α-olefin, or with 20% by weight or less in total of a monomer containing 0.5% by weight or more of an acid anhydride group and a polar α-olefin, (b) from 0 to 80 parts by weight of a copolymer of ethylene and a non-polar α-olefin, or a polyolefin resin containing 20% by weight or less of a polar α-olefin, (c) from 10 to 90 parts by weight of a polyamide, provided that the total amount of the components (a), (b) and (c) is 100 parts by weight, the resin composition having a melt index of 5 g/10 min or more and less than 500 g/10 min.

(2) Methacrylic acid is preferred as the monomer containing a carboxyl group and maleic anhydride as the monomer containing an acid anhydride group in the polyolefin resin of (a).

(3) A polyolefin resin consisting of only hydrocarbons is preferred as the polyolefin resin of (b).

(4) A polyamide obtained from a dimer acid and a diamine is preferred as the polyamide (c).

(5) A polyamide having an amine value of from 1 to 10 is preferred.

(6) The resin composition may contain a halogen-based flame retardant.

(7) The resin composition may contain from 0.5 to 10 parts by weight of a phenol-based antioxidant based on 100 parts by weight of the total amount of components (a), (b) and (c).

(8) 2,2'-methylenebis(4-methyl-6-tert-butylphenol) is preferred as the phenol-based antioxidant.

(9) A hot-melt adhesive as in any one of items (1) to (8), wherein a hot-melt adhesive having a melt index of 1 g/10 min or more and less than 300 g/10 min after irradiation with electron beams of from 50 to 400 kGy is preferred.

(10) A molded article having a tube form or a rod form comprising a hot-melt adhesive as in any one of items (1) to (9) is provided.

(11) A heat recoverable article comprising a polymeric material having on an inner surface thereof a layer comprising a hot-melt adhesive as in any one of items (1) to (9) is provided.

The invention is described in detail below.

(i) The hot-melt adhesive resin composition according to the invention comprises (a) from 0.1 to 50 parts by weight of a polyolefin resin obtained by copolymerizing 80% by weight or more of a non-polar α-olefin with 20% by weight or less in total of a monomer containing 5% by weight or more of a carboxyl group and a polar α-olefin, or with 20% by weight or less in total of a monomer containing 0.5% by weight or more of an acid anhydride group and a polar α-olefin, (b) from 0 to 80 parts by weight of a copolymer of ethylene and a non-polar α-olefin, or a polyolefin resin containing 20% by weight or less of a polar α-olefin, (c) from 10 to 90 parts by weight of a polyamide, provided that the total amount of the components (a), (b) and (c) is 100 parts by weight. The resin composition has a melt index of 5 g/10 min or more and less than 500 g/10 min.

(ii) The polyolefin resin (a) obtained by copolymerizing a non-polar α-olefin with a monomer containing a carboxyl group or an acid anhydride group is described in detail below.

Examples of the polyolefin resin (a) used in the invention include a copolymer obtained by copolymerizing or graft-copolymerizing a monomer containing a carboxyl group or its anhydride, e.g., acrylic acid, methacrylic acid, fumaric acid, maleic acid and maleic anhydride, with a polyolefin obtained by polymerizing one α-olefin, e.g., ethylene, propylene, butene, octene, hexene, methyl acrylate, methyl methacrylate and vinyl acetate, or by copolymerizing two or more of these α-olefins.

Specific examples of the polyolefin resin (a) include a copolymer of an α-olefin, e.g., ethylene, propylene and butene; an α,β-unsaturated carboxylic ester, e.g., methyl acrylate, methyl methacrylate and vinyl acetate; and an α,β-unsaturated dicarboxylic acid or its anhydride, e.g., maleic acid and maleic anhydride, and/or an α,β-unsaturated carboxylic acid, e.g., acrylic acid and methacrylic acid. Representative examples thereof include a copolymer of ethylene, ethyl acrylate and maleic anhydride.

Specific examples of the polyolefin resin (a) also include a copolymer of an α-olefin, e.g., ethylene, propylene and butene; and an α,β-unsaturated carboxylic acid, e.g., acrylic acid and methacrylic acid, or an α,β-unsaturated dicarboxylic acid or its anhydride, e.g., maleic acid and maleic anhydride.

Representative examples thereof include an ethylene-methacrylic acid copolymer.

The total content of the monomer containing 5% by weight or more of a carboxyl group and the polar α-olefin is 20% by weight or less, and the monomer containing 0.5% by weight or more of an acid anhydride group and the polar α-olefin is 20% by weight or less, both in the polyolefin resin (a). The content of the monomer containing a carboxyl group is preferably from 5 to 15% by weight, and the content of the monomer containing an acid anhydride group is preferably from 0.5 to 5% by weight.

The total content of the monomer containing a carboxyl group or the monomer containing an acid anhydride group and the polar α-olefin is more preferably from 1 to 15% by weight.

It is preferred that the total content of the monomer containing a carboxyl group or the monomer containing an acid anhydride group and the polar α-olefin does not exceed 20% by weight, since the adhesiveness to PE and the adhesiveness at low temperature are lowered.

In the invention, a copolymer containing maleic anhydride as a monomer for an acid anhydride group has excellent adhesiveness.

The amount of the polyolefin resin (a) is from 0.1 to 50 parts by weight, and preferably from 0.5 to 30 parts by weight. When it is less than 0.1 part by weight, sufficient adhesiveness cannot be obtained, and when it exceeds 50 parts by weight, the melt flow index often becomes 5 g/10 min or less, and stable molding fluidity cannot be obtained.

(iii) The copolymer of ethylene and a non-polar α-olefin, or the polyolefin resin containing 20% by weight or less of a polar α-olefin (b) is described in detail below.

Representative examples of copolymer of ethylene and a non-polar α-olefin used in the invention include a homopolymer of ethylene and a copolymer of ethylene and at least one of octene, hexene, butene and propylene. Polyolefin resins containing 20% or less by weight of a polar α-olefin include, for example, a copolymer of ethylene and at least one of methyl acrylate, methyl metacrylate, vinyl acetate, octene and hexene. It is specifically preferable to use for the invention a polyolefin resin containing 10% or less by weight of a polar α-olefin.

In this case, a polyolefin resin containing no polar α-olefin is preferred.

It is preferred that the content of the polar α-olefin does not exceed 20% by weight, since the adhesiveness to PE and the adhesiveness at low temperature are lowered.

The amount of the polyolefin resin (b) is from 0 to 80 parts by weight, and preferably from 10 to 60 parts by weight. It is preferred that an added amount does not exceed 80 parts by weight, since the adhesiveness to a metal is lowered.

(iv) The polyamide (c) is described in detail below.

Representative examples of the polyamide (c) used in the invention include a condensation product of a diamine and a dicarboxylic acid, and a polyamide obtained from a dimer acid and a diamine is preferred.

The amount of the polyamide (c) is from 10 to 90 parts by weight, and preferably from 20 to 80 parts by weight.

When the amount of the polyamide (c) is less than 10 parts by weight, the adhesiveness to PVC and a metal is insufficient, and when it exceeds 90 parts by weight, the adhesiveness to a polyolefin, e.g., PE, is insufficient.

(v) The flow characteristic and so on are described in detail below.

(1) In the resin composition of the invention, the flowability of the individual resin components is not limited, but when they are mixed to form the resin composition of the invention, it must have a melt flow index of 5 g/10 min or more and less than 500 g/10 min measured at a temperature of 150° C. and a load of 2,160 g.

When the melt flow index is less than 5 g/10 min, the flowability is insufficient, resulting in deteriorated adhesiveness to the article to be processed and waterproofness, and when it is 500 g/10 min or more, the resin composition cannot be molded into a tube by extrusion molding.

The melt flow index of the resin composition is preferably 10 g/10 min or more and less than 200 g/10 min.

When the melt flow index is less than 200 g/10 min, the resin composition can be easily molded in a prescribed shape with heat melt extrusion molding. When it is 10 g/10 min or more, the sealing property of hot melting is more improved.

(2) The amine value of the polyamide (c) is preferably from 1 to 10, and more preferably from 1 to 8.

The amine value less than 1 tends to result in the inability to obtain, sufficient adhesiveness, and when it exceeds 10, the melt flow index of the resin composition often decreases to less than 5 g/10 min, which results in the inability to obtain stable flowability.

(vi) The flame retardancy of the hot-melt adhesive of the invention is described in detail below.

It has been known that when a halogen-based flame retardant is mixed with a polymer, the limiting oxygen index (OI value) is increased and thus the flame retardancy is improved, but the adhesiveness to PE is lowered.

The inventors have found that the resin composition of the invention does not suffer a decrease in adhesive strength even when a halogen-based flame retardant is added.

Preferred examples of the halogen-based flame retardant include a polybromodiphenyl ether, a brominated ethylene bisphthalimide derivative, a bis(brominated phenyl) terephthalamide derivative and a brominated bisphenol derivative.

The amount of the added flame retardant cannot be unequivocally determined without determining the extent of desired flame retardancy, but is preferably from 5 to 50% by weight based on the total resin composition.

(vii) The heat recoverable article of the invention is described in detail below.

In the event that a heat recoverable article is produced by a crosslinking method using electron beam irradiation, deterioration in flowability of the adhesive resin composition often occurs due to crosslinking.

The hot-melt adhesive composition of the invention has a characteristic feature in that it does not suffer from deterioration in flowability even when a heat recoverable article is produced by a crosslinking method using electron beam irradiation.

In the invention, the melt index of the resin composition after irradiation of a specified amount of electron beams, i.e., from 50 to 400 kGy, preferably from 50 to 300 kGy, is preferably 1 g/10 min or more and less than 300 g/10 min, and more preferably 5 g/10 min or more and less than 200 g/10 min.

When it is less than 1 g/10 min, the waterproofness and adhesiveness are insufficient due to insufficient flowability. When it is 300 g/10 min or more, it is not preferred since positional deviation occurs when the atmospheric temperature is slightly increased after adhesion to an adherend.

It has been found that the adhesive strength to PE, PVC and iron is increased by applying irradiation of electron beams to the hot-melt adhesive resin composition of the invention.

(viii) The antioxidant to be used in the invention is described in detail below.

In the event that the flowability of the hot-melt adhesive composition of the invention is decreased by irradiation of electron beams, the addition of an antioxidant, particularly hindered phenol-based antioxidants, hydroquinone derivatives and phenol-based antioxidants, is effective to prevent such decrease in flowability.

The added amount of the antioxidant is generally from 0.5 to 10 parts by weight, and preferably from 1 to 5 parts by weight based on 100 parts by weight of the total amount of components (a), (b) and (c).

By adding the antioxidant, the melt index of the hot-melt adhesive composition of 1 g/10 min or more and less than 300 g/10 min can be ensured after irradiation of the specified amount of electron beams.

It is preferred that the amount of the antioxidant is not less than 0.5 part by weight, since the flowability is unstable, and that does not exceed 10 parts by weight, since blooming, that is, migration of the antioxidant to surfaces, occurs.

Particularly, 2,2'-methylenebis(4-methyl-6-tert-butylphenol) is preferably used as the phenol-based antioxidant since coloring and blooming after irradiation of electron beams can be reduced.

(ix) Other features of the invention are described in detail below.

(a) A process for producing a heat recoverable article such as a heat shrinkable tube according to the invention is not particularly limited, and it can be produced by a known process using various polymeric materials.

Examples of the polymeric material as a raw material of the heat recoverable article include PE, PVC, EVA, EEA, chlorinated polyethylene and various thermoplastic elastomers (for example, a polyester elastomer).

Various additives such as a crosslinking agent and a filler may be added to the polymeric materials.

Specifically, the process for producing the heat recoverable article may generally comprise forming a resin composition comprising the polymeric material into a tube form; crosslinking or partial crosslinking by a method including irradiation of an ionized radiation such as electron beams and γ-ray, chemical crosslinking and silane crosslinking; inserting into a mold having a prescribed shape; and expanding under a high-temperature atmosphere, followed by cooling while maintaining its expanded shape.

Among the production processes, crosslinking with irradiation of an ionized radiation is widely used in industry owing to a short crosslinking time, resulting in good productivity.

(b) The hot-melt adhesive composition of the invention has a characteristic feature in that it exhibits good adhesiveness to PE, PVC and a metal without the need of a tackifier, which is generally used in hot-melt adhesives.

(c) Other additives, such as an ultraviolet absorbent, an antioxidant, a colorant, a filler, a viscosity imparting agent and a tackifier, may be added to the hot-melt adhesive composition of the invention.

(d) In the invention, it is preferred to form an inner layer comprising the hot-melt adhesive composition on an inner surface of the heat recoverable article.

In this case, such a heat recoverable article is preferably melt extruded by co-extrusion of a polymeric material forming the heat shrinkable tube and a material containing the hot-melt adhesive composition forming the inner layer.

(e) The heat shrinkable tube provided with the inner layer can be crosslinked or partially crosslinked by irradiating with an ionized radiation. The heat shrinkable tube may be crosslinked by chemical crosslinking or silane crosslinking, and in these cases, the hot-melt adhesive composition may be used as an inner layer adhesive.

(f) The molded article having a tube form or a rod form using the hot-melt adhesive composition of the invention can be obtained by a melt extrusion method or an injection molding method of an article having a prescribed length.

With the molded article obtained from the process as described above placed between a heat-shrinkable tube and an adherend and by causing the heat-shrinkable tube to be shrunk, it is possible to cover completely the adherend by a layer of the adhesive. Specifically, it is effective for obtaining a higher adhesiveness and waterproofness to place the molded article along with the gaps or the uneven surfaces of the adherend and cause the heat-shrinkable tube positioned over the adherend to shrink as the gaps and uneven portions on the surfaces of the adherend become filled with the adhesive.

BEST MODE OF CARRYING OUT THE INVENTION

The invention is described in more detail with reference to the following Examples and Comparative Examples, but the invention is not construed as being limited to the examples.

The evaluation methods of the characteristics are described below.

(1) Adhesiveness 1

An adherend sheet comprising PE or PVC was used, which had a dimension of 20 mm in width, 1 mm in thickness and 100 mm in length. A sheet comprising the hot-melt adhesive composition of the invention having a dimension of 20 mm in width, 1 mm in thickness and 100 mm in length was inserted between two sheets of the same kind of adherend sheets, and a laminate obtained was pressed at 150° C. and 10 kg/cm² for 5 minutes while maintaining a clearance of 3 mm.

The laminate was peeled off by pulling the ends of the adherend sheet at a pulling rate of 50 mm/min, to measure the peel strength.

In the event that the adherend is iron, two sheets comprising the hot-melt adhesive composition each having a dimension of 20 mm in width, 1 mm in thickness and 100 mm in length were applied to both surfaces of an iron plate having a dimension of 20 mm in width, 1 mm in thickness and 100 mm in length, and a laminate obtained was pressed at 150° C. and 10 kg/cm² for 5 minutes while maintaining a clearance of 3 mm.

The laminate was peeled off by pulling the ends of the sheets comprising the hot-melt adhesive composition at a pulling rate of 50 mm/min, to measure the peel strength.

Rust that formed at an adhered interface to iron was visually evaluated

The peel strength was evaluated for the following three grades:

⊙: Peel strength of 1 kg/10 mm or more

603: Peel strength of 0.5 kg/10 mm or more and less than 1 kg/10 mm

X: Peel strength of less than 0.5 kg/10 mm

As the adherend, PE, PVC and iron were used.

(2) Adhesiveness 2

A sample of a heat shrinkable tube having an inner layer was placed on various electric cables and then shrunk. The cable covered with the shrunk heat shrinkable tube was cut along the longitudinal direction into a half cylindrical form, and the heat shrinkable tube was peeled from one end. The tube was pulled at 180° to be peeled off from the cable at a pulling rate of 50 mm/min, to measure the peel strength.

The peel strength was evaluated for the following three grades:

⊙: Peel strength of 1 kg/10 mm or more

○: Peel strength of 0.5 kg/10 mm or more and less than 1 kg/10 mm

X: Peel strength of less than 0.5 kg/10 mm (3) Filling-up Property

A sample of a heat shrinkable tube having an inner layer was placed on various electric cables and then shrunk. The cable covered with the shrunk heat shrinkable tube was cut, to evaluate the presence or absence of a gap between the heat shrinkable tube and the cable. For the filling-up property, a sample without a gap was graded "good", and a sample with a gap was graded "poor".

(4) Flame Retardancy

The flame retardancy was evaluated by measuring a limiting oxygen index of the adhesive resin composition in the form of a sheet having a thickness of 2 mm.

The limiting oxygen index used herein means a minimum oxygen concentration required for maintaining combustion when a sheet-formed molded article was subjected to combustion in a mixed gas of oxygen and nitrogen.

(5) Melt Index

The melt index is a melt flow index at 150° C. and 2,160 g.

(6) Melt Viscosity

The melt viscosity was measured with Brookfield Thermosel B-type viscometer.

(7) Amine Value

The amine value is an amount of potassium hydroxide in terms of mg equivalent to the amino group contained in 1 g of polyamide.

EXAMPLES 1 TO 13, 18, 19 AND COMPARATIVE EXAMPLES 1 TO 10

According to the compositions shown in Tables 1 to 4 below, the components were mixed and kneaded in an 8-inch open roll mixer at 140° C., and pressed into a sheet form having a thickness of 1 mm or 2 mm by using a pressing apparatus set up at 120° C.

The molded articles in the form of a sheet were irradiated with a prescribed amount of electron beams with an accelerated voltage of 1 MeV when they required electron beam irradiation.

The resulting resin compositions were evaluated for adhesiveness, flowability, flame retardancy, formation of rust, coloring and blooming. The results obtained are shown in Tables 1 to 4.

Examples 1 to 6, 8, 9, 18 and 19 showed good qualities for adhesiveness and flowability, and good qualities against the generation of rust, coloring and blooming.

Example 7 showed good qualities for adhesiveness, flowability, and flame retardancy, and good qualities against the generation of rust, coloring and blooming.

Examples 10 to 13 were the examples of the resin compositions after irradiation. All of these examples showed good qualities as in the case before the irradiation.

On the other hand, Comparative Examples 1 and 4 to 8 were insufficient in adhesiveness, and Comparative Examples 2 and 3 were insufficient in flowability. Comparative Examples 9 and 10 were inferior and exhibited serious blooming.

EXAMPLES 14 TO 17 AND COMPARATIVE EXAMPLES 11 TO 19

Examples of a heat recoverable article are described below.

An EVA resin (melt index: 3 g/10 min (190° C., 2,160 g), vinyl acetate content: 25% by weight, flame retardant includes) was used as an outer layer. As an inner layer material, according to the compositions shown in Tables 5 and 6, the components were mixed and kneaded in a 12-inch open roll mixer at 140° C., followed by pelletization. The outer layer and inner layer were co-extruded to form a tube with an inner layer having an outer diameter of the outer layer of 6 mm, an inner diameter of the outer layer of 5 mm, and an inner diameter of the inner layer of 4 mm.

The tube was irradiated with 150 kGy of electron beams with an accelerated voltage of 2 MeV. The tube thus obtained was expanded in a high-temperature vessel at 150° C. to have an inner diameter of the inner layer of 8 mm, to produce a heat shrinkable tube.

The resulting heat shrinkable tube was placed on a PVC or PE resin-coated electric cable and a steel pipe (diameter: 5 mm) and then heat shrunk. Samples of the resin-coated electric cables and the steel pipe covered with the heat shrinkable tube were evaluated for the filling-up property of the inner layer material, adhesiveness, formation of rust, coloring and blooming. The results obtained are shown in Tables 5 and 6.

Examples 14 to 17 showed good qualities for adhesiveness, and filling-up property, and good qualities against coloring and blooming. On the other hand, Comparative Examples 11 and 14 to 18 were insufficient in adhesiveness, and Comparative Examples 12 and 13 were insufficient in filling-up property. Comparative Example 19 was inferior since it exhibited blooming.

TABLE 1

| | Example | | | | | | | | | | |
|---|---|---|---|---|---|---|---|---|---|---|---|
| | 1 | 2 | 3 | 4 | 5 | 6 | 7 | 8 | 9 | 18 | 19 |
| Polyolefin containing acid anhydride[1] | 5 | 40 | 1 | — | 10 | 5 | 5 | 10 | 10 | — | 40 |
| Polyolefin containing acid anhydride[13] | — | — | — | — | — | — | — | — | — | 5 | — |
| Polyolefin containing carboxyl group[2] | — | — | — | 5 | — | — | — | — | — | — | — |
| Polyamide resin[3] | 80 | 10 | 60 | 80 | 70 | — | 80 | 70 | 70 | 80 | 10 |
| Polyamide resin[4] | — | — | — | — | — | 80 | — | — | — | — | — |
| Polyolefin[5] | 15 | 50 | 39 | 15 | — | 15 | 15 | — | — | 15 | — |
| Polyolefin[6] | — | — | — | — | 20 | — | — | 20 | 20 | — | — |
| Polyolefin[14] | — | — | — | — | — | — | — | — | — | — | 50 |
| Flame retardant[7] | — | — | — | — | — | — | 20 | — | — | — | — |
| Phenol-based antioxidant[8] | — | — | — | — | — | — | — | 1 | 10 | — | — |
| Adhesiveness 1 | | | | | | | | | | | |
| Adhesiveness to PE (kg/mm$^2$) | ⊙ | ⊙ | ⊙ | ⊙ | ⊙ | ⊙ | ⊙ | ⊙ | ⊙ | ⊙ | ⊙ |
| Adhesiveness to PVC (kg/mm$^2$) | ⊙ | ⊙ | ⊙ | ⊙ | ⊙ | ⊙ | ⊙ | ⊙ | ⊙ | ⊙ | ⊙ |
| Adhesiveness to iron (kg/mm$^2$) | ⊙ | ⊙ | ⊙ | ⊙ | ⊙ | ⊙ | ⊙ | ⊙ | ⊙ | ⊙ | ⊙ |
| Rust at adhesive interface to iron | no | no | no | no | no | no | no | no | no | no | no |
| Flowability | | | | | | | | | | | |
| Melt index (g/10 min) | 200 | 50 | 100 | 80 | 120 | 140 | 80 | 120 | 140 | 200 | 50 |
| Flame retardancy | | | | | | | | | | | |
| Limiting oxygen index | — | — | — | — | — | — | 25 | — | — | — | — |
| Coloring | no | no | no | no | no | no | no | no | no | no | no |
| Blooming | no | no | no | no | no | no | no | no | no | no | no |

TABLE 1-continued

|  | Example | | | | | | | | | | |
|---|---|---|---|---|---|---|---|---|---|---|---|
|  | 1 | 2 | 3 | 4 | 5 | 6 | 7 | 8 | 9 | 18 | 19 |

Note for Table 1:
(i) Polyolefin containing acid anhydride (a):
*1)Ethylene-ethyl acrylate-maleic anhydride copolymer, melt index: 70 g/10 min, ethyl acrylate content: 10% by weight, maleic anhydride content: 3% by weight
*13)Ethylene-ethyl acrylate-maleic anhydride copolymer, melt index: 70 g/10 min, ethyl acrylate content: 17% by weight, maleic anhydride content: 3% by weight
(ii) Polyolefin resin containing carboxyl group (a):
*2)Ethylene-methacrylic acid copolymer, melt index: 100 g/10 min, methacrylic acid content: 10% by weight
(iii) Polyamide resin (c):
*3)Dimer acid-based polyamide resin, softening point: 100° C., melt viscosity: 10,500 mPa · s (190° C.), amine value: 5.0
*4)Dimer acid-based polyamide resin, softening point: 100° C., melt viscosity: 7,500 mPa · s (190° C.), amine value: 1.0
(iv) Polyolefin resin (b):
*5)Polyethylene, melt index: 30 g/10 min, density: 0.902 g/cm$^3$
*6)Polyethylene, melt index: 75 g/10 min, density: 0.919 g/cm$^3$
*14)Ethylene-ethyl acrylate copolymer, melt index: 30 g/10 min, ethyl acrylate content: 10% by weight
(v) Flame retardant:
*7)Decabromodiphenyl ether
(vi) Phenol-based antioxidant:
*8)2,2'-methylenebis(4-methyl-6-tert-butylphenol)

TABLE 2

|  | Example | | | |
|---|---|---|---|---|
|  | 10 | 11 | 12 | 13 |
| Polyolefin containing acid anhydride*1) | 5 | 10 | 10 | 5 |
| Polyamide resin*3) | 80 | 70 | 70 | 80 |
| Polyolefin*5) | 15 | — | — | 15 |
| Polyolefin*6) | — | 20 | 20 | — |
| Flame retardant*7) | — | — | — | 20 |
| Phenol-based antioxidant*8) | — | 1 | 10 | 5 |
| After irradiation with electron beams of 100 kGy | | | | |
| Adhesiveness 1 | | | | |
| Adhesiveness to PE (kg/mm$^2$) | ⊚ | ⊚ | ⊚ | ⊚ |
| Adhesiveness to PVC (kg/mm$^2$) | ⊚ | ⊚ | ⊚ | ⊚ |
| Adhesiveness to iron (kg/mm$^2$) | ⊚ | ⊚ | ⊚ | ⊚ |
| Rust at adhesive interface to iron | no | no | no | no |
| Flowability | | | | |
| Melt index (g/10 min) | 110 | 90 | 100 | 60 |
| Flame retardancy | | | | |
| Limiting oxygen index | — | — | — | 26 |
| Coloring | no | no | no | no |
| Blooming | no | no | no | no |
| After irradiation with electron beams of 400 kGy | | | | |
| Adhesiveness 1 | | | | |
| Adhesiveness to PE (kg/mm$^2$) | ⊚ | ⊚ | ⊚ | ⊚ |
| Adhesiveness to PVC (kg/mm$^2$) | ⊚ | ⊚ | ⊚ | ⊚ |
| Adhesiveness to iron (kg/mm$^2$) | ⊚ | ⊚ | ⊚ | ⊚ |
| Rust at adhesive interface to iron | no | no | no | no |
| Flowability | | | | |
| Melt index (g/10 min) | 1 | 5 | 50 | 20 |
| Flame retardancy | | | | |
| Limiting oxygen index | — | — | — | 26 |
| Coloring | no | no | no | no |
| Blooming | no | no | no | no |

Note for Table 2:
(i) Polyolefin containing acid anhydride (a):
*1)Ethylene-ethyl acrylate-maleic anhydride copolymer, melt index: 70 g/10 min, ethyl acrylate content: 10% by weight, maleic anhydride content: 3% by weight
(iii) Polyamide resin (c):
*3)Dimer acid-based polyamide resin, softening point: 100° C., melt viscosity: 10,500 mPa · s (190° C.), amine value: 5.0
(iv) Polyolefin resin (b):
*5)Polyethylene, melt index: 30 g/10 min, density: 0.902 g/cm$^3$
*6)Polyethylene, melt index: 75 g/10 min, density: 0.919 g/cm$^3$
(v) Flame retardant:
*7)Decabromodiphenyl ether
(vi) Phenol-based antioxidant:
*8)2,2'-methylenebis(4-methyl-6-tert-butylphenol)

TABLE 3

|  | Comparative Example | | | | | | | | |
|---|---|---|---|---|---|---|---|---|---|
|  | 1 | 2 | 3 | 4 | 5 | 6 | 7 | 8 | 9 |
| Polyolefin containing acid anhydride*1) | — | 60 | — | 10 | 10 | 5 | — | — | 10 |
| Polyolefin containing carboxyl group*2) | — | — | 20 | — | — | — | — | — | — |
| Polyamide resin*3) | 80 | 10 | — | — | 70 | — | 100 | — | 70 |
| Polyamide resin*4) | — | — | — | — | — | 80 | — | — | — |

TABLE 3-continued

|  | Comparative Example | | | | | | | | |
|---|---|---|---|---|---|---|---|---|---|
|  | 1 | 2 | 3 | 4 | 5 | 6 | 7 | 8 | 9 |
| Polyamide resin*9) | — | — | 50 | — | — | — | — | — | — |
| Polyamide resin*10) | — | — | — | 40 | — | — | — | — | — |
| Polyolefin*5) | 20 | 40 | 30 | — | — | — | — | 100 | — |
| Polyolefin*6) | — | — | — | — | — | — | — | — | — |
| Polyolefin*11) | — | — | — | — | 20 | — | — | — | 20 |
| Polyolefin*12) | — | — | — | 50 | — | 15 | — | — | — |
| Flame retardant*7) | — | — | — | — | — | — | 20 | 20 | - |
| Phenol-based antioxidant*8) | — | — | — | — | — | — | — | — | 15 |
| Adhesiveness 1 | | | | | | | | | |
| Adhesiveness to PE (kg/mm²) | X | ◎ | ◎ | ○ | X | X | X | X | X |
| Adhesiveness to PVC (kg/mm²) | ○ | ○ | ◎ | X | ◎ | ◎ | ○ | X | ◎ |
| Adhesiveness to iron (kg/mm²) | ○ | ◎ | ◎ | X | ◎ | ◎ | ○ | X | ◎ |
| Rust at adhesive interface to iron | no | No | no | no | yes | no | no | no | yes |
| Flowability | | | | | | | | | |
| Melt index (g/10 min) | 250 | 0.5 | 0 | 100 | 180 | 210 | 80 | 120 | 180 |
| Flame retardancy | | | | | | | | | |
| Limiting oxygen index | — | — | — | — | — | — | 25 | 25 | — |
| Coloring | no | No | no | no | no | no | no | no | no |
| Blooming | no | No | no | no | no | no | no | no | yes |

Note for Table 3:
(i) Polyolefin containing acid anhydride (a):
*1)Ethylene-ethyl acrylate-maleic anhydride copolymer, melt index: 70 g/10 min, ethyl acrylate content: 10% by weight, maleic anhydride content: 3% by weight
(ii) Polyolefin resin containing carboxyl group (a):
*2)Ethylene-methacrylic acid copolymer, melt index: 100 g/10 min, methacrylic acid content: 10% by weight
(iii) Polyamide resin (c):
*3)Dimer acid-based polyamide resin, softening point: 100° C., melt viscosity: 10,500 mPa · s (190° C.), amine value: 5.0
*4)Dimer acid-based polyamide resin, softening point: 100° C., melt viscosity: 7,500 mPa · s (190° C.), amine value: 1.0
*9)Dimer acid-based polyamide resin, softening point: 115° C., melt viscosity: 1,100 mPa · s (190° C.), amine value: 16
*10)Dimer acid-based polyamide resin, softening point: 115° C., melt viscosity: 10,500 mPa · s (190° C.), amine value: 0.6
(iv) Polyolefin resin (b):
*5)Polyethylene, melt index: 30 g/10 min, density: 0.902 g/cm³
*6)Polyethylene, melt index: 75 g/10 min, density: 0.919 g/cm³
*11)Ethylene-vinyl acetate copolymer, melt index: 350 g/10 min, vinyl acetate content: 28% by weight
*12)Ethylene-ethyl acrylate copolymer, melt index: 300 g/10 min, ethyl acrylate content: 28% by weight
(v) Flame retardant:
*7)Decabromodiphenyl ether
(vi) Phenol-based antioxidant:
*8)2,2'-methylenebis(4-methyl-6-tert-butylphenol)

TABLE 4

|  | Comparative Example 10 |
|---|---|
| Polyolefin containing acid anhydride*1) | 10 |
| Polyamide resin*3) | 70 |
| Polyolefin*12) | 20 |
| Phenol-based antioxidant*8) | 15 |
| *After irradiation with electron beams of 100 kGy* | |
| Adhesiveness 1 | |
| Adhesiveness to PE (kg/mm²) | X |
| Adhesiveness to PVC (kg/mm²) | ◎ |
| Adhesiveness to iron (kg/mm²) | ◎ |
| Rust at adhesive interface to iron | no |
| Flowability | |
| Melt index (g/10 min) | 115 |
| Flame retardancy | |
| Limiting oxygen index | — |
| Coloring | yes |
| Blooming | yes |
| *After irradiation with electron beams of 400 kGy* | |
| Adhesiveness 1 | |
| Adhesiveness to PE (kg/mm²) | X |
| Adhesiveness to PVC (kg/mm²) | ◎ |
| Adhesiveness to iron (kg/mm²) | ◎ |
| Rust at adhesive interface to iron | no |
| Flowability | |
| Melt index (g/10 min) | 100 |
| Flame retardancy | |
| Limiting oxygen index | — |
| Coloring | yes |
| Blooming | yes |

Note for Table 4:
(i) Polyolefin containing acid anhydride (a):
*1)Ethylene-ethyl acrylate-maleic anhydride copolymer, melt index: 70 g/10 min, ethyl acrylate content: 10% by weight, maleic anhydride content: 3% by weight

TABLE 4-continued

|  | Comparative Example 10 |
|---|---|

(iii) Polyamide resin (c):
*[3] Dimer acid-based polyamide resin, softening point: 100° C., melt viscosity: 10,500 mPa · s (190° C.), amine value: 5.0
(iv) Polyolefin resin (b):
*[12] Ethylene-ethyl acrylate copolymer, melt index: 300 g/10 min, ethyl acrylate content: 28% by weight
(vi) Phenol-based antioxidant:
*[8] 2,2'-methylenebis(4-methyl-6-tert-butylphenol)

TABLE 5

|  | Example | | | |
|---|---|---|---|---|
|  | 14 | 15 | 16 | 17 |
| Polyolefin containing acid anhydride*[1] | 5 | 10 | 10 | 5 |
| Polyamide resin*[3] | 80 | 70 | 70 | 80 |
| Polyolefin*[5] | 15 | — | — | 15 |
| Polyolefin*[6] | — | 20 | 20 | — |
| Flame retardant*[7] | — | — | — | 20 |
| Phenol-based antioxidant*[8] | — | 1 | 10 | 5 |
| Evaluation as heat shrinkable tube Adhesiveness 2 | | | | |
| Adhesiveness to PE (kg/mm²) | ◎ | ◎ | ◎ | ◎ |
| Adhesiveness to PVC (kg/mm²) | ◎ | ◎ | ◎ | ◎ |
| Adhesiveness to iron (kg/mm²) | ◎ | ◎ | ◎ | ◎ |
| Rust at adhesive interface to iron | no | no | no | no |
| Filling-up property | good | good | good | good |
| Coloring | no | no | no | no |
| Blooming | no | no | no | no |

Note for Table 5:
(i) Polyolefin containing acid anhydride (a):
*[1] Ethylene-ethyl acrylate-maleic anhydride copolymer, melt index: 70 g/10 min, ethyl acrylate content: 10% by weight, maleic anhydride content: 3% by weight
(iii) Polyamide resin (c):
*[3] Dimer acid-based polyamide resin, softening point: 100° C., melt viscosity: 10,500 mPa · s (190° C.), amine value: 5.0
(iv) Polyolefin resin (b):
*[5] Polyethylene, melt index: 30 g/10 min, density: 0.902 g/cm³
*[6] Polyethylene, melt index: 75 g/10 min, density: 0.919 g/cm³
(v) Flame retardant:
*[7] Decabromodiphenyl ether
(vi) Phenol-based antioxidant:
*[8] 2,2'-methylenebis(4-methyl-6-tert-butylphenol)

TABLE 6

|  | Comparative Example | | | | | | | | |
|---|---|---|---|---|---|---|---|---|---|
|  | 11 | 12 | 13 | 14 | 15 | 16 | 17 | 18 | 19 |
| Polyolefin containing acid anhydride*[1] | — | 60 | — | 10 | 10 | 5 | — | — | 10 |
| Polyolefin containing carboxyl group*[2] | — | — | 60 | — | — | — | — | — | — |
| Polyamide resin*[3] | 80 | 10 | — | — | 70 | — | 100 | — | 70 |
| Polyamide resin*[4] | — | — | — | — | — | 80 | — | — | — |
| Polyamide resin*[9] | — | — | 10 | — | — | — | — | — | — |
| Polyamide resin*[10] | — | — | — | 40 | — | — | — | — | — |
| Polyolefin*[5] | 20 | 40 | 30 | — | — | — | — | 100 | — |
| Polyolefin*[6] | — | — | — | — | — | — | — | — | — |
| Polyolefin*[11] | — | — | — | — | 20 | — | — | — | - |
| Polyolefin*[12] | — | — | — | 50 | — | 15 | — | — | 20 |
| Flame retardant*[7] | — | — | — | — | — | — | 20 | 20 | — |
| Phenol-based antioxidant*[8] | — | — | — | — | — | — | — | — | 15 |
| Evaluation as heat shrinkable tube Adhesiveness 2 | | | | | | | | | |
| Adhesiveness to PE (kg/mm²) | X | ◎ | ◎ | ○ | X | X | X | X | X |
| Adhesiveness to PVC (kg/mm²) | ○ | ○ | ◎ | X | ◎ | ◎ | ○ | X | ◎ |
| Adhesiveness to iron (kg/mm²) | ○ | ◎ | ◎ | X | ◎ | ◎ | ○ | X | ◎ |
| Rust at adhesive interface to iron | no | no | no | no | yes | no | no | no | no |
| Filling-up property | good | poor | poor | poor | good | good | good | poor | good |
| Coloring | no | no | no | no | no | no | no | no | no |
| Blooming | no | no | no | no | no | no | no | no | yes |

Note for Table 6:
(i) Polyolefin containing acid anhydride (a):
*[1] Ethylene-ethyl acrylate-maleic anhydride copolymer, melt index: 70 g/10 min, ethyl acrylate content: 10% by weight, maleic anhydride content: 3% by weight
(ii) Polyolefin resin containing carboxyl group (a):
*[2] Ethylene-methacrylic acid copolymer, melt index: 100 g/10 min, methacrylic acid content: 10% by weight
(iii) Polyamide resin (c):
*[3] Dimer acid-based polyamide resin, softening point: 100° C., melt viscosity: 10,500 mPa · s (190° C.), amine value: 5.0

TABLE 6-continued

|  | Comparative Example | | | | | | | | |
|---|---|---|---|---|---|---|---|---|---|
|  | 11 | 12 | 13 | 14 | 15 | 16 | 17 | 18 | 19 |

*4)Dimer acid-based polyamide resin, softening point: 100° C., melt viscosity: 7,500 mPa · s (190° C.), amine value: 1.0
*9)Dimer acid-based polyamide resin, softening point: 115° C., melt viscosity: 1,100 mPa · s (190° C.), amine value: 16
*10)Dimer acid-based polyamide resin, softening point: 115° C., melt viscosity: 10,500 mPa · s (190° C.), amine value: 0.6
(iv) Polyolefin resin (b):
*5)Polyethylene, melt index: 30 g/10 min, density: 0.902 g/cm$^3$
*6)Polyethylene, melt index: 75 g/10 min, density: 0.919 g/cm$^3$
*11)Ethylene-vinyl acetate copolymer, melt index: 350 g/10 min, vinyl acetate content: 28% by weight
*12)Ethylene-ethyl acrylate copolymer, melt index: 300 g/10 min, ethyl acrylate content: 28% by weight
(v) Flame retardant:
*7)Decabromodiphenyl ether
(vi) Phenol-based antioxidant:
*8)2,2'-methylenebis(4-methyl-6-tert-butylphenol)

According to the invention, a hot-melt adhesive that can adhere to any of PE or PVC and a metal can be obtained.

By using the hot-melt adhesive resin composition of the invention as an inner adhesive layer of a heat recoverable article, or by using a molded article in a tube form or a rod form of the hot-melt adhesive resin composition of the invention as replenishment of an inner layer of a heat shrinkable tube, a heat recoverable article excellent in adhesiveness, waterproofness and corrosion protection to various adherends including PE, PVC and a metal can be obtained. Particularly, the invention is valuable as a heat shrinkable tube having an inner adhesive layer used for processing a joint and an end of electric cables.

What is claimed is:

1. A hot-melt adhesive comprising a resin composition comprising (a) from 0.1 to 50 parts by weight of a polyolefin resin obtained by copolymerizing 80% by weight or more of a non-polar α-olefin with 20% by weight or less in total of a monomer containing 5% by weight or more of a carboxyl group and a polar α-olefin, or with 20% by weight or less in total of a monomer containing 0.5% by weight or more of an acid anhydride group and a polar α-olefin, (b) from 10 to 60 parts by weight of a copolymer of ethylene and a non-polar α-olefin, or a polyolefin resin containing 20% by weight or less of a polar α-olefin, and (c) from 20 to 80 parts by weight of a polyamide, provided that the total amount of said components (a), (b) and (c) is 100 parts by weight, said resin composition having a melt index of 5 g/10 min or more and less than 500 g/10 min.

2. A hot-melt adhesive as claimed in claim 1, wherein said monomer containing a carboxyl group and said monomer containing an acid anhydride group are methacrylic acid and maleic anhydride, respectively.

3. A hot-melt adhesive as claimed in claim 1, wherein said polyolefin resin (b) comprises only hydrocarbons.

4. A hot-melt adhesive as claimed in claim 1, wherein said polyamide (c) is a polyamide obtained from a dimer acid and a diamine.

5. A hot-melt adhesive as claimed in claim 4, wherein said polyamide (c) has an amine value of from 1 to 10.

6. A hot-melt adhesive as claimed in claim 1, wherein said resin composition contains a halogen-based flame retardant based on 100 parts by weight of the total amount of components (a), (b) and (c).

7. A hot-melt adhesive as claimed in claim 1, wherein said resin composition contains from 0.5 to 10 parts by weight of a phenol-based antioxidant based on 100 parts by weight of the total amount of components (a), (b) and (c).

8. A hot-melt adhesive as claimed in claim 7, wherein said phenol-based antioxidant is 2,2'-methylenebis(4-methyl-6-tert-butylphenol).

9. A hot-melt adhesive as claimed in claim 1, wherein said hot-melt adhesive has a melt index of 1 g/10 min or more and less than 300 g/10 min after irradiation with electron beams of from 50 to 400 kGy.

10. A molded article having a tube form or a rod form comprising a hot-melt adhesive as claimed in claim 1.

11. A heat recoverable article comprising a polymeric material having on an inner surface thereof a layer comprising a hot-melt adhesive as claimed in claim 1.

* * * * *